United States Patent [19]

Burdick et al.

[11] 3,825,093
[45] July 23, 1974

[54] MODULAR AIR CUSHION TRANSPORTING SYSTEM

[75] Inventors: Robert E. Burdick; Baxter K. Wolf, both of Santa Barbara, Calif.

[73] Assignee: Rolair Systems, Inc., Santa Barbara, Calif.

[22] Filed: Jan. 2, 1973

[21] Appl. No.: 320,138

[52] U.S. Cl............... 180/119, 180/125, 180/14 R
[51] Int. Cl............................................. B60v 1/18
[58] Field of Search .......... 180/119, 125, 121, 214; 214/1 BE; 280/34 A, 34 B, 415 B, DIG. 8

[56] References Cited
UNITED STATES PATENTS

| 2,790,196 | 4/1957 | Rideout et al. | 280/79.1 |
|---|---|---|---|
| 3,004,772 | 10/1961 | Bohlen et al. | 280/415 B |
| 3,052,483 | 9/1962 | Petersen | 180/125 |
| 3,272,359 | 9/1966 | Thomas et al. | 214/1 BE |
| 3,276,530 | 10/1966 | Borneman | 137/525.3 |
| 3,357,511 | 12/1967 | Mackle | 180/125 |
| 3,401,767 | 9/1968 | Barr | 180/121 |
| 3,592,285 | 7/1971 | Noble | 180/119 |

*Primary Examiner*—Kenneth H. Betts
*Assistant Examiner*—Jack D. Rubenstein
*Attorney, Agent, or Firm*—Harris, Kern, Wallen & Tinsley

[57] ABSTRACT

A modular system for moving heavy loads, using a plurality of air cushion transporters coupled together. A plurality of identical air cushion transporters with load carrying platforms riding on air bearings, and means for mechanically and pneumatically interconnecting the transporters for movement as a unit.

5 Claims, 7 Drawing Figures

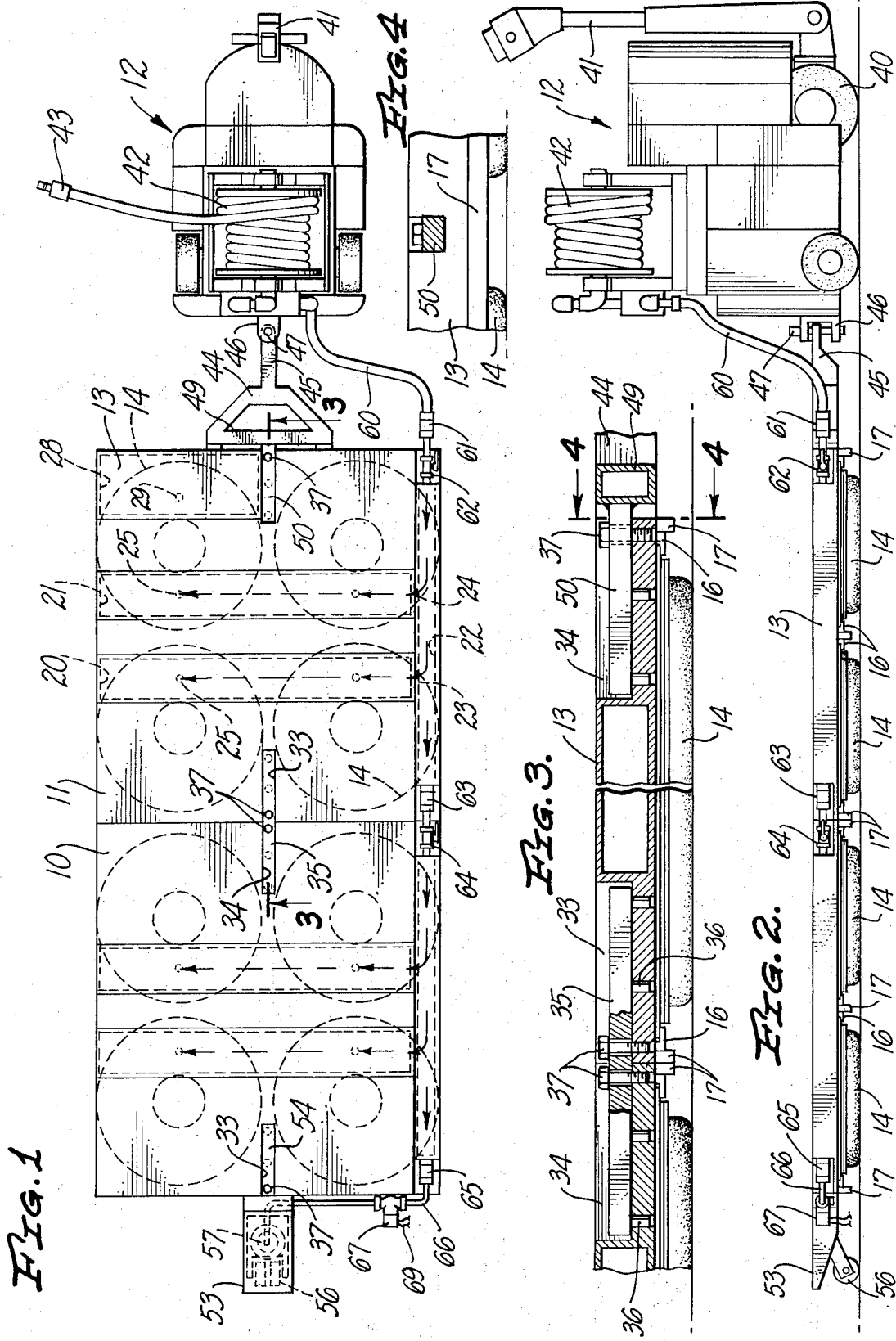

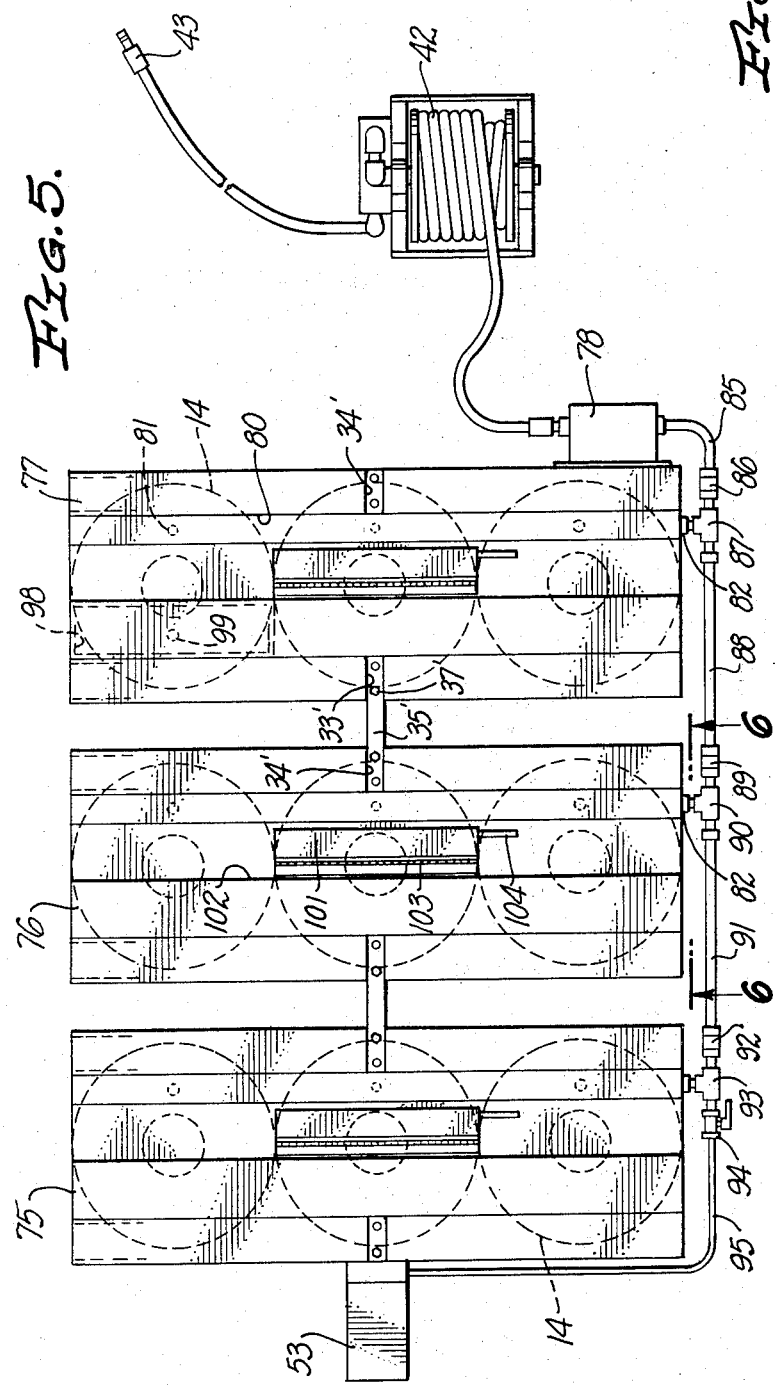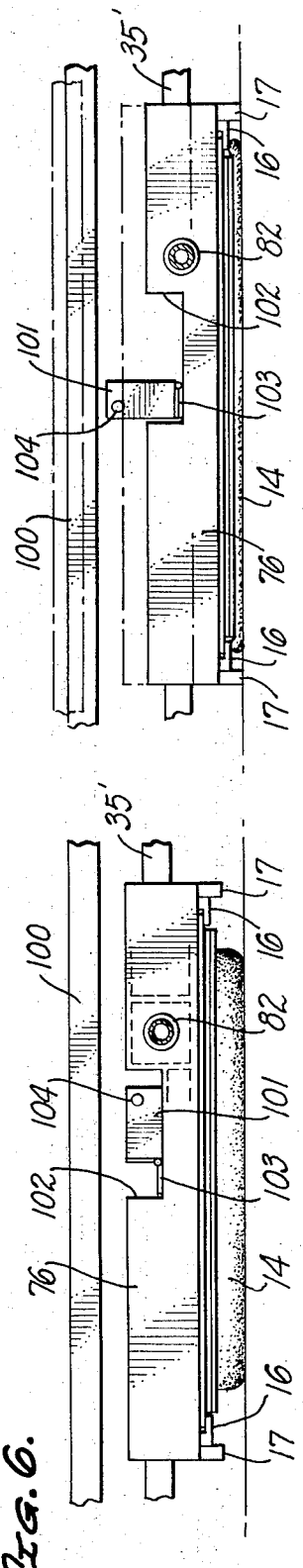

MODULAR AIR CUSHION TRANSPORTING SYSTEM

This invention relates to air cushion devices and in particular, to a modular system for moving loads of various size and weight. The invention contemplates a plurality of substantially identical air cushion transporters interconnected mechanically and pneumatically to form a unit for transporting a load. The number of transporters interconnected can be varied at will thereby providing a transportation system for manufacturing or maintenance or storage facility suitable for handling a wide range of loads thereby reducing the number of different transportation devices necessary for operation of the facility.

A typical single transporter with a platform and replaceable air bearings is shown in the copending application of Robert E. Burdick entitled "Replaceable Air Cushion Device," Ser. No. 180,666, filed Sept. 15, 1971. Compressed air is delivered to the air bearings which generate a film of air between the transporter and the ground surface resulting in a very low friction between the transporter and ground.

In the present invention, the standard transporter is modified to provide mechanical and pneumatic interconnections to produce the multiple transporter system, with the connections being changeable at will and with the connections being contained within the transporter platforms so there is no increase in overall height and no loss of load carrying capability. The strong, simple and low profile characteristics of the standard transporter are maintained with the modular system of the present invention. Other objects, advantages, features and results will more fully appear in the course of the following description.

In the drawings:

FIG. 1 is a top view of a multiple transporter system incorporating a presently preferred embodiment of the invention;

FIG. 2 is a side view of the system of FIG. 1;

FIG. 3 is an enlarged partial sectional view taken along the lines 3—3 of FIG. 1;

FIG. 4 is a partial sectional view taken along the line 4—4 of FIG. 3;

FIG. 5 is a view similar to that of FIG. 1 showing an alternative embodiment of the invention;

FIG. 6 is an enlarged partial sectional view taken along the line 6—6 of FIG. 5 showing the air bearings in the inflated condition while the transporters are being moved under a load; and FIG. 7 is a view similar to that of FIG. 6 illustrating a load engaging operation.

FIGS. 1-4 illustrate interconnected transporters 10, 11, and a drive unit 12. The transporters are identical and each includes a platform 13 and four replaceable air bearings 14. The platform is a unitary structure and typically is formed of tubular steel sections welded together. The air bearings may be standard units such as are shown in the aforementioned copending application Ser. No. 180,666, filed Sept. 15, 1971, now U.S. Pat. No. 3,756,342, and are slidingly received on the underside of the platform 13 in slots formed by angle brackets 16. Support bars 17 are carried at opposite edges of the platform for engaging the ground surface to support the platform when the air bearings are uninflated.

The platform 11 may include a tubular beam 20, another tubular beam 21 and another tubular beam 22. Aligned openings are provided at 23 and at 24 to provide communication between the beams 20, 21, 22 so that the beams may serve as air conduits. Openings 25 are provided in the lower surface of the beams 20, 21 for communication with corresponding opening in the air bearings. If desired, a damping chamber can be provided in the platform for each air bearing and typically may comprise another box beam 28 with an opening 29 for communication with a corresponding opening in the air bearing. One damping chamber is shown in FIG. 1, but a separate damping chamber can be provided for each air bearing in a transporter.

Coupling receptacles 33, 34 are provided at opposite ends of the platform 13. These are identical in configuration and preferably comprise a channel or groove formed in the platform, with a threaded opening and two smooth openings. The transporters 10, 11 are joined together by a coupling member such as a bar 35 positioned in the aligned receptacles 33, 34. Pins 36 on the bar 35 are positioned in the corresponding openings, with bolts 37 passing through the bar 35 into the threaded opening, thus providing a mechanical coupling between the transporters which maintains the transporters in alignment. Any number of transporters can be joined in this manner.

The drive unit 12 may be a conventional drive mechanism with drive wheel 40 driven by a battery powered motor (not shown), with manual steering and control obtained by a control lever 41. A reel of hose 42 may be carried on the drive unit for connection to a remote source of compressed air at hose coupling 43.

The drive unit 12 may be connected to the transporter 11 by a coupling bar 44 having a tongue 45 connected to a drive unit yoke 46 with a pin 47. The bar 44 has a cross member 49 which engages an edge of the platform 13, and a coupling member 50 for positioning in the receptacle 34 and engaging the openings thereof in the same manner as the coupling bar 35.

A guide unit 53 may be joined to the transporter 10 at the receptacle 33, the guide unit having a coupling bar 54 which is mounted in the receptacle 33 in the same manner as the coupling bar 35. A typical guide unit is shown in the copending application of Robert E. Burdick entitled "Retractable Guide Mechanism," Ser. No. 300,186, filed Oct. 24, 1972. The guide unit includes a wheel 56 and an air actuated power unit 57 which when energized urges the wheel 56 downward into engagement with the ground surface to serve as a guide wheel and prevent lateral movement of the interconnected transporters. Air may be supplied to the conduits in the platforms by a hose line 60 connected to the line 42 of the drive unit, a coupling 61, valve 62, another coupling 63, and another valve 64, with a coupling 65 on the transporter 10 for connection to additional transporters or to the guide unit 53 via a line 66 and valve 67. In the embodiment illustrated, each of the couplings 61, 63, 65 is of the type which is closed to air flow unless a line is connected thereto. With this arrangement, any number of transporters can be coupled together, with the conduit 22 of the transporter providing air flow to the next transporter. The manually operated valves 62, 64 are preferred but are not essential. The valve 67 is shown as a solenoid operated valve which can be connected back to the drive unit or other control location via leads 69 for remote control of the actuator of the guide unit. Alternatively, a manual valve can be used if desired.

As can be seen in FIG. 2, the mechanical and pneumatic connections for the transporters and for the drive unit and guide unit are located within the transporters and below the top surface thereof, so that these interconnections do not interfere with or in anyway impede the capability of the transporters for engaging and handling loads.

An alternative embodiment for the transporter system is shown in FIGS. 5–7, wherein elements corresponding to those of the embodiments of FIG. 1–4 are identified by these same reference numerals. In this alternative embodiment, a plurality of transporters 75,76,77 are joined in spaced relation, using a mechanical interconnection system very similar to that of the first embodiment. Also, the drive unit is omitted, with a control box 78 mounted directly on transporter 77, and with the reel hose 42 resting on a dolly or the like (not shown).

The transporters 75, 76, 77 may be identical and are very similar to the transporters 10, 11. The transporter includes a platform formed of a plurality of box beams welded together, with three air bearings 14 slideably mounted in the grooves formed by the brackets 16, in the same manner described for the embodiment of FIG. 1. The box beam 80 serves as a conduit supplying air to all three bearings of a transporter through bottom openings 81, with a coupling 82 at one end for engagement with the air line.

Mechanical coupling receptacles 33', 34' are provided on opposite sides of the transporter for receiving a coupling bar 35', all of which may correspond to the receptacles 33, 34 and bar 35 of FIG. 1.

Air is provided from the line 42 through the control box 78, a line 85, a coupling 86, a tee fitting 87, another line 88, another coupling 89, another tee fitting 90, another line 91, another coupling 92, and another tee fitting 93. Air may be provided to the guide unit 53 through a valve 94 and a line 95. The couplings 86, 89, 92 may correspond to the coupling 61 of FIG. 1, with each of the tee fittings 87, 90, 93 being connected to the couplings 82 of the corresponding transporter for supplying air to the conduit in the platform. As with the transporter of FIG. 1, a damping chamber may be incorporated in the platform and one is illustrated comprising a box beam 98 with an opening 99 communicating with a corresponding opening in the air bearing. In the embodiment illustrated, the control box 78 includes a control for turning air on and off. Alternatively this could be omitted, with the air control provided at the hose reel or other locations. The coupled transporters of FIG. 5 may be moved by attaching a drive unit at the receptacle 34' of transporter 77. Other means of moving may be utilized, including manual forces applied to the transporters and/or to the loads thereon. The spacing between the transporters is readily varied to accomodate various sizes of load. This is accomplished by using coupling bars 35 of various lengths and using air lines 88, 91 with corresponding variations in length.

A load may be placed on a transporter system by lowering with a crane or the like. Alternatively, a load may be applied by moving the transporters under the load and then engaging the load, and the low profile of the transporters of the present invention are particularly adapted to this latter procedure. A load engaging member 101 is pivotally mounted in a recess 102 in the platform by means of a hinge 103. With the air bearings inflated and the load engaging member 101 in the horizontal position as seen in FIG. 6, the transporters are moved under the load, illustrated schematically as 100 in FIGS. 6 and 7. The load may be resting on skids or other supports and the low profile of the transporters permits their positioning under loads with very small ground clearance. The air bearings are now deflated and the transporters move downward with the bars 17 supporting the transporters on the ground surface, as shown in solid line in FIG. 7. The load engaging members 101 are rotated to the vertical position, typically by manually grasping the handles 104, with the vertical position seen in FIG. 7. The air bearings are now inflated and the transporters raised bringing the members 101 into engagement with the load, thereby raising the load from the ground surface to the position in phantom lines in FIG. 7. The transporter system is now ready for moving the load as desired. The load is removed by reversing the steps of the process.

With the transporter system described and illustrated herein, any number of transporters can be interconnected to carry a particular load. When that particular job is completed, the transporters can be interconnected in some other configuration for carrying a different load, there being no limitation on the number of transporters which can be utilized in a system.

We claim:

1. A multiple transporter system, including in combination:
   a plurality of air cushion transporters, each of said transporters including a platform and a plurality of air bearings, said platform including
   means for slidingly receiving said air bearings,
   downwardly facing openings for communication with corresponding openings in said air bearings,
   conduit means for supplying air under pressure to said openings,
   front and rear sides with vertical flat surfaces for abutting engagement of adjacent platforms along said sides;
   upwardly opening mechanical coupling receptacles on said front and rear sides and flush with or within said sides, and
   air coupling means in communication with said conduit means;
   a separate mechanical coupling member engageable with the mechanical coupling receptacles of adjacent platforms for joining said platforms; and
   an air coupling member engageable with the air coupling means of adjacent platforms for interconnecting the conduit means of said platforms.

2. A system as defined in claim 1 wherein the coupled transporters are maintained in abutting engagement by said coupling member.

3. A system as defined in claim 1 with the coupled transporters maintained in spaced parallel relation by said coupling member.

4. A system as defined in claim 1 including a guide unit having:
   mounting means engageable with the mechanical coupling receptacle of a platform for joining the guide unit to the platform;
   a guide wheel;
   air actuated means for urging said guide wheel downward;

means defining an air line for coupling said air actuated means to said air coupling member; and
on-off control valve in said air line.

5. A system as defined in claim 4 including a drive unit for moving said transporters, said drive unit including
a power unit with drive wheels,
a mechanical coupling unit pivotally carried on said power unit and having mounting means engageable with the mechanical coupling receptacle of a platform for joining the power unit to the platform, and a hose for coupling an air supply to the platform air coupling means.

* * * * *